June 12, 1928. 1,673,496
L. R. CHURCHILL
METHOD OF PRODUCING CARBON BLACK FROM MIXTURES OF ACETYLENE AND OTHER HYDROCARBONS
Filed July 11, 1923
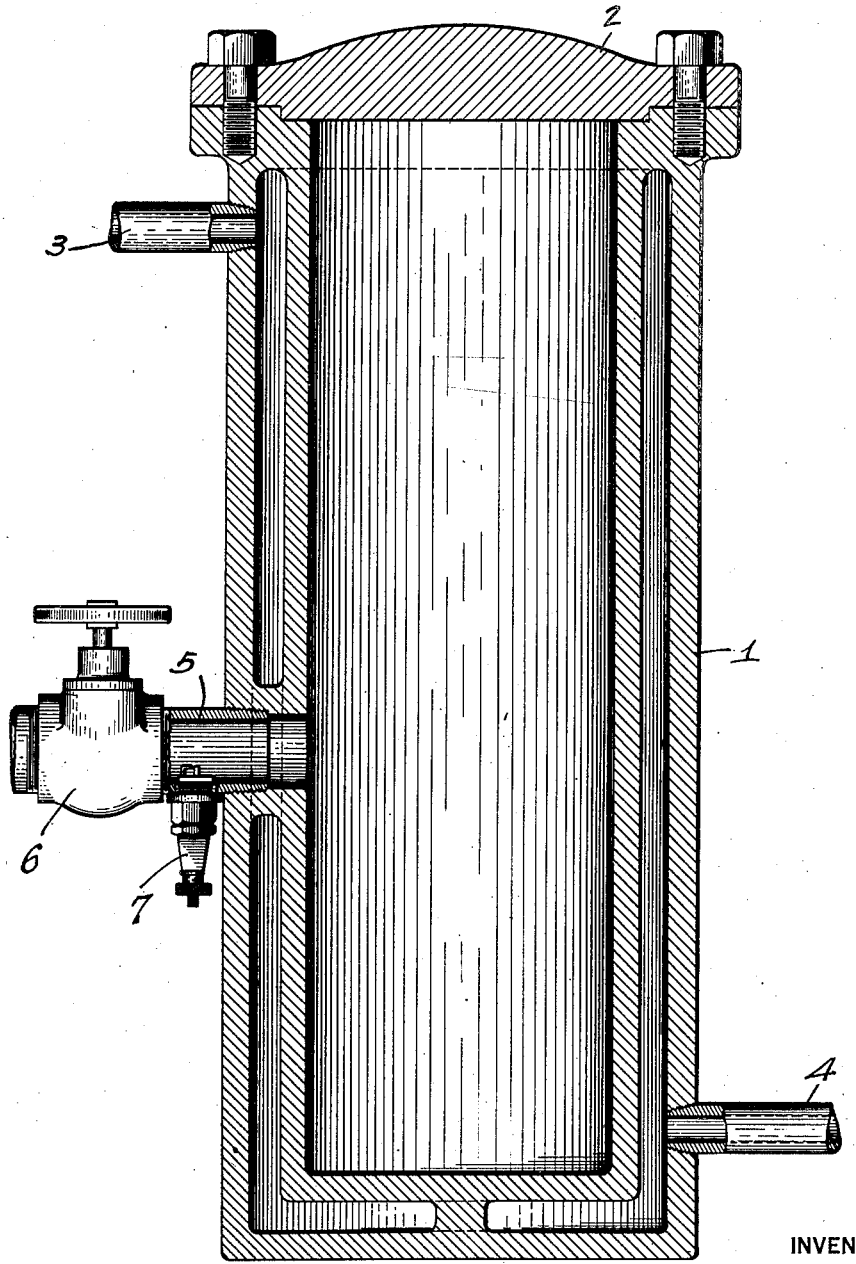
INVENTOR
LEONARD R. CHURCHILL
BY
ATTORNEY Patented June 12, 1928.

1,673,496

UNITED STATES PATENT OFFICE.

LEONARD R. CHURCHILL, OF BAYONNE, NEW JERSEY, ASSIGNOR TO THE GOODYEAR TIRE & RUBBER COMPANY, OF AKRON, OHIO, A CORPORATION OF OHIO.

METHOD OF PRODUCING CARBON BLACK FROM MIXTURES OF ACETYLENE AND OTHER HYDROCARBONS.

Application filed July 11, 1923. Serial No. 650,894.

My invention pertains to the production of carbon black, and it has particular relation to the production of such material from mixtures of acetylene gas and other hydrocarbons.

Heretofore, the principal source of carbon black has been from the incomplete combustion of natural gas or methane, but carbon black so produced is frequently of inferior quality, and in addition, the process of production is wasteful.

One of the main applications of carbon black is found in its utilization as a filler in compounding with rubber in the production of a wide variety of rubber articles. In order to be of any great value in the rubber industry, the carbon black must necessarily be of high quality and, consequently, the inferior carbon black frequently produced by the incomplete combustion of methane is unfit for compounding with rubber.

The quality of carbon black is manifested by its obscuring power and by the size of the particles thereof, black of good quality consisting of very finely divided particles. Exposing carbon black to heat for a long period causes its deterioration, since the particles thereof agglomerate and become hardened.

It has been suggested that very high quality carbon black may be produced by the detonation of acetylene gas, or of acetylene gas mixed with air or oxygen. The proposed method was to confine the gas, or mixture of gases, in a suitable chamber under pressure and effect a detonation thereof by any suitable means, such as an electric spark. The resulting extremely violent explosion or detonation decomposed the acetylene into its elements, carbon and hydrogen, and resulted in the deposition of a very finely divided form of carbon black, which also possesses a high obscuring power. In fact, experimental tests have proven that carbon black so produced is especially adapted for compounding with rubber to produce high quality products.

The term carbon black is herein employed to denote the carbon deposit resulting from the decomposition of acetylene and other hydrocarbons. This explanation of the term is offered since carbon black is generally understood, by those engaged in the manufacture, use and sale thereof, to denote the product of the incomplete combustion of natural gas.

The single figure of the accompanying drawing is a transverse sectional view of a cylinder adapted for confining gases under pressure, which may be utilized in practicing my invention.

Hydrocarbons, such as natural gas and light oils, as derived from the distillate of coal or its components, benzene, toluene, xylene or the like, either pure or inadmixture, or any sufficiently volatile petroleum hydrocarbons, such as petroleum ether, are capable of decomposition into their elements, carbon and hydrogen, at a somewhat elevated temperature. In order to secure a sufficiently high temperature, the hydrocarbons may be mixed with a small amount of air, or oxygen, to burn a fraction of them to form the heat necessary to raise the temperature of the remainder. However, this alone will not produce satisfactory decomposition without an excessive loss by burning. In other words, it becomes necessary to burn the larger portion of the hydrocarbon in order to heat the remainder sufficiently to decompose. If an attempt is made to explode an air-hydrocarbon mixture, such a concentration of air must be utilized that practically all of the hydrocarbon goes to $CO$ and $CO_2$. This is demonstrated in automobile engines.

Acetylene is inherently unstable, and, especially under pressure, decomposes with extreme violence into its elements with the rapid evolution of large amounts of heat. Consequently, the rapid decomposition or detonation of the acetylene may be utilized to promote the decomposition of more stable materials associated therewith. The violence and rapidity with which the decomposition occurs depends, however, upon the pressure, and if the acetylene be mixed with other hydrocarbons and air, its detonating action is greatly decreased. This reduction in the detonating action of the acetylene, by its diffusion into the other gas, may be obviated by my novel method of introducing the gases into an explosion chamber and the manner of ignition. For example, the air and other hydrocarbons may first be introduced into the explosion chamber, and the acetylene subsequently introduced therein, when a suitable pressure may be established. Immediately after the introduction of the acetylene into the explosion chamber, and before it has had time to diffuse into the rest of the gas, thus getting diluted and having its detonating action decreased, an electric spark may be caused to ignite or detonate the almost pure acetylene remaining near the inlet opening of the chamber. Such a method effects a detonation of the almost pure acetylene gas whereby the entire gaseous content of the chamber is subjected to an explosion of extreme violence.

Obviously, the necessity of segregating the acetylene gas from the mixture of other hydrocarbons and air might be avoided by employing a higher pressure for the whole mixture, because this would raise the pressure of the acetylene. However, this is not particularly desirable because the pressure realized upon the explosion of such a mixture is proportional to the initial pressure. It is desirable, therefore, to maintain the initial pressure as low as possible to obtain the detonating result, since very high pressures introduce difficulties in obtaining an explosion chamber of sufficient strength.

It will be apparent that other detonators may be utilized, such, for example, as iso-propyl-nitrite. Moreover, it is possible to form accelerators by reason of the chemical reaction effected by the explosion.

In order to insure a clear and accurate understanding of my invention, reference may be had to the drawing in which is shown a cylinder 1 having a removable head 2. The cylinder has a double wall construction into which conduits 3 and 4 are connected to provide for circulating a cooling medium, such as water, around the cylinder walls. An inlet pipe 5 is fitted within an opening located in the cylinder 1 to communicate with the interior thereof, and is provided with a suitable valve 6. A spark plug 7, of ordinary construction, is secured within the inlet pipe 5 adjacent to the cylinder to afford means for igniting or detonating the gas which is to be decomposed.

In practicing my invention, air or oxygen may be first admitted to the cylinder 1 through the inlet pipe 5, after which a hydrocarbon, such as petroleum ether, benzene, methane, or the like, is introduced into the chamber. Acetylene is then forced into the chamber and a suitable pressure is established. The pressure established in the explosion chamber may be varied to a great extent without sacrificing quality or percentage of yield of carbon black, but probably the lower limit of pressure should be substantially 15 pounds per square inch, and the upper limit is controlled by the strength of the explosion chamber that may be provided by known materials of construction. However, I have found that from 50 to 75 pounds per square inch produces very satisfactory results both in quality and quantity of production. The valve 6 in the inlet pipe is, of course, closed when a suitable pressure of the gas is established in the chamber. Immediately after the acetylene has been introduced into the chamber, a spark is caused to bridge the gap of the spark plug by any suitable means, not shown, whereupon the acetylene gas adjacent the inlet opening of the chamber is detonated.

The detonation of the acetylene effects a decomposition of the other hydrocarbon introduced into the chamber, and a carbon black of very high quality is deposited in the chamber. In order to maintain the quality of the carbon black thus produced, it should be removed from the explosion chamber at frequent periodic intervals. If desired, it may be removed after each explosion, or it may be removed after a predetermined series of explosions, it only being necessary to determine how long the carbon black deposit may be left in the chamber without deterioration. The cylinder is, of course, constantly cooled by a circulation of water through the conduits and around the cylinder jacket.

If petroleum ether or other volatile petroleum hydrocarbons are utilized in admixture with acetylene, such hydrocarbons are introduced into the explosion chamber in the form of a vapor. It is desired, therefore, that the term "gas", as employed in the claims, be interpreted to include the vapor form of light oils or volatile petroleum hydrocarbons.

The importance of my invention is significant when it is considered that only a very small proportion of methane may be exploded in a mixture of acetylene gas and air at atmospheric pressure. The highest proportion of methane that may be utilized in a mixture of acetylene under atmospheric pressure is one-tenth volume of methane, four volumes of acetylene and one volume of air, but if the gases are subjected to a pressure of 75 pounds per square inch, seven-tenths volume of methane may be mixed with four volumes of acetylene and one volume of air to secure a high yield of carbon black. It will be seen, therefore, that approximately seven times the quantity of methane may be utilized with acetylene to produce a high quality carbon black when the proper method of handling the gases is adopted. Moreover, when the gases are confined in an explosion chamber and the acetylene is utilized as a detonating agent by exploding the acetylene before it has become diffused into the other gas, a much higher proportion of the stable gas may be utilized. For example, five volumes of acetylene may be admixed with five volumes of methane and one volume of air under substantially 75 pounds pressure to obtain a high yield of fine quality carbon black. My invention, therefore, materially increases the amount of cheaper hydrocarbons that may be utilized with acetylene to produce carbon black of high quality.

It will be appreciated that the hydrocarbon most suitable for use with the acetylene depends to a great extent upon the market conditions of the gases. For example, although petroleum ether is now more expensive than methane, nevertheless compared with a volumetrically equal quantity it is productive of from five to six times the carbon obtained from methane, and, inasmuch as acetylene is so expensive, the increased carbon yield on acetylene more than pays the difference of petroleum ether over methane. My invention, however, is not especially directed to the particular admixture of gases utilized, but comprehends more particularly the utilization of a detonating agent to decompose a relatively stable gas into its elements to produce high quality carbon black.

Although I have specifically described a method embodying my invention, it will be obvious that minor changes may be made therein without departing from the spirit or scope of the invention, and I desire, therefore, that no limitations shall be imposed except such as are indicated in the appended claims.

What I claim is:

1. A method of producing carbon black which comprises introducing five volumes of hydrocarbon gas and one volume of air into an explosion chamber, introducing a segregated charge of acetylene into the chamber, and exploding the whole before the acetylene has been diffused through the hydrocarbon gas.

2. A method of producing carbon black which comprises introducing approximately five volumes of hydrocarbon gas and one volume of air into an explosion chamber, introducing a segregated charge of acetylene into the chamber, exploding the whole before the acetylene has been diffused through the hydrocarbon gas, and cooling the chamber preparatory to the insertion of a new charge.

3. A method of producing carbon black that involves the continuous repetition of a cycle which comprises introducing a mixture of air and a hydrocarbon gas into an explosion chamber, forcing a large volume of acetylene gas into the chamber, detonating the whole before the acetylene diffuses into the other gas, and cooling the chamber.

4. A method of producing carbon black that involves the continuous repetition of the following cycle: introducing a mixture of air and methane into an explosion chamber, forcing a large volume of acetylene gas into the chamber under pressure, effecting a detonation of the whole charge by producing an electric spark in the acetylene before it is materially diffused, and cooling the chamber.

5. A method of producing carbon black that involves the continuous repetition of the following cycle: introducing a mixture of air and a volatile petroleum hydrocarbon into an explosion chamber, forcing a large volume of acetylene gas into the chamber under pressure, effecting a detonation of the whole charge before the acetylene can become materially diffused by producing an electric spark in the acetylene and cooling the chamber.

In witness whereof, I have hereunto signed my name.

LEONARD R. CHURCHILL.